United States Patent [19]
Duzan

[11] Patent Number: 5,214,607
[45] Date of Patent: May 25, 1993

[54] LOOK-AHEAD FIFO BYTE COUNT APPARATUS

[75] Inventor: Steven P. Duzan, Cayce, S.C.

[73] Assignee: NCR Corporation, Dayton, Ohio

[21] Appl. No.: 617,730

[22] Filed: Nov. 26, 1990

[51] Int. Cl.$^5$ .................................................. G11C 7/00
[52] U.S. Cl. ..................................... 365/221; 365/219
[58] Field of Search ........................ 365/219, 221, 220; 364/261.7, 938.2, 948; 395/425

[56] References Cited

U.S. PATENT DOCUMENTS

| | | | |
|---|---|---|---|
| 2,907,004 | 9/1959 | Chien et al. | 340/174 |
| 3,811,117 | 5/1974 | Anderson | 365/233 |
| 3,898,631 | 8/1975 | Brown et al. | 340/173 R |
| 3,953,838 | 4/1976 | Gilberg et al. | 340/173 |
| 4,159,532 | 6/1979 | Getson | 364/900 |
| 4,242,738 | 12/1980 | Dingwall | 365/189.05 |
| 4,506,348 | 3/1985 | Miller et al. | 365/73 |
| 4,528,648 | 7/1985 | Lew | 365/236 |
| 4,815,039 | 3/1989 | Tai et al. | 365/189 |
| 4,829,475 | 5/1989 | Ward et al. | 365/78 |
| 4,873,666 | 10/1989 | Lefebvre | 365/221 |
| 4,888,741 | 12/1989 | Malinowski | 365/221 |
| 4,933,901 | 6/1990 | Tai | 365/221 |
| 5,021,994 | 6/1991 | Tai | 365/220 |

*Primary Examiner*—Eugene R. LaRoche
*Assistant Examiner*—A. Zarabian
*Attorney, Agent, or Firm*—Jack R. Penrod

[57] ABSTRACT

A look-ahead method and apparatus for monitoring the number of bytes in a FIFO memory. The apparatus uses look-ahead techniques to determine all possible results and then selects the appropriate result from all of the possible results to update a byte count register. The selection is based on the number of bytes READ and the number of bytes WRITTEN during a FIFO memory cycle. This look-ahead method and apparatus provides a definite time advantage over known FIFO monitoring systems that perform an addition or subtraction with the READs and WRITEs at the end of each FIFO cycle, and then use the arithmetic result to update a byte count register.

14 Claims, 4 Drawing Sheets

LOOK-AHEAD FIFO BYTE COUNT APPARATUS

BACKGROUND OF THE INVENTION

The present invention relates to a first-in-first-out (FIFO) memory, and more particularly to an apparatus that maintains a count of the number of bytes in a FIFO memory that are filled with data.

FIFO memories, or simply FIFOs, are well know in the electronic data processing art. For example, FIFOs are commonly used to time-buffer data as it is transferred between systems or subsystems that have differing data and clock rates.

The first-in, first-out feature of all FIFOs allows data to be WRITTEN into the FIFO at will at a data input port, and READ from the FIFO at will at a data output port. Because of the freedom to WRITE and READ data at will, data overflow and underflow are major concerns. Data overflow occurs when more data is WRITTEN into a FIFO than it has capacity to store, and data underflow occurs when more data is READ from a FIFO than has been WRITTEN. To prevent data overflow and underflow problems, a FIFO usually is provided with some type of monitor which controls the data input gates and the data output gates to prevent any overflow or underflow.

Some FIFO monitors use WRITE counters to count the number of data words WRITTEN into the FIFO, and READ counters to count the number of data words READ from the FIFO. The WRITE and READ counters are regularly compared to see if their counts are the same, which is the underflow threshold condition, or if a difference between their counts is equal to the storage capacity of the FIFO, which is the overflow threshold condition. These comparisons between the counts of the two counters require large amounts of system time, especially the comparison that is made to the FIFO storage capacity after the READ count is subtracted from the WRITE count. With higher and higher speed peripherals and subsystems transferring larger and larger amounts of data, a FIFO monitor which is based on WRITE and READ counters will limit to the throughput of the FIFO.

Further, if the WRITE counters and READ counters counted data bytes instead of data words, then the dual counter type FIFO monitor becomes even slower because each counter must count or increment multiple times each time a data word is WRITTEN or READ. For example, if there are four data bytes to data word then four FIFO count cycles are required simply to update the counters. In addition to updating, subtraction and comparison must also be performed. Therefore, monitoring the byte capacity of a FIFO having multi-byte data words with a counter type monitor may take six or more FIFO clock cycles, which for large, high speed data throughputs is unacceptable.

SUMMARY OF THE INVENTION

Briefly stated, in accordance with one aspect of the invention, the foregoing shortcomings of FIFO monitors are overcome by providing a FIFO control apparatus for use with a FIFO memory that has a READ control line, a WRITE control line, and a clock line and includes a look-ahead circuit that is connected to the READ control line, the WRITE control line, and the clock line. This look-ahead circuit uses look-ahead techniques in order to provide an updated number of bytes stored in the FIFO memory for each period of the clock signal.

In another aspect of the invention, the aforementioned shortcomings of FIFO monitors are overcome by providing a monitor for use with a FIFO having a plurality of WRITE control lines and a plurality of READ control lines. The FIFO monitor includes a clock pulse device for defining a FIFO clock period, and a look-ahead device that is connected to the plurality of READ control lines and the plurality of WRITE control lines for providing a number of WRITE control lines that were active during the FIFO clock period, a number of READ control lines that were active during the FIFO clock period, and a net number of bytes that is equal to a number of WRITE control lines that were active diminished by a number of READ control lines that were active during the FIFO clock period. The look-ahead device provides three binary outputs to represent the three possible combinations of the control lines. Also included is a device for detecting if a WRITE operation was completed, a READ operation was completed, both a WRITE operation and a READ operation were completed, or neither a WRITE nor a READ operation was completed during the FIFO clock period. This detecting device has one input connected to the WRITE control lines, another input connected to the READ control lines, a timing input connected to the clock pulse means, and a two bit binary output. The two bit binary output has four possible binary output combinations, each corresponding to one of the four operation completed possibilities. A selector, which has three binary data inputs, each connected to a different one of said three binary outputs of the look-ahead device, a fourth binary input that is connected to logic LO, and a two-bit binary selection input that is connected to the output of the detecting device. The output of the detecting device selects one of the three binary outputs from the look-ahead device or the logic LO input as the selector's output according to the two bit output of the detecting device. The output of the selector is connected to one addend input of an adder. A second addend input is connected to an output of a memory device. Further, the adder output is connected to the input of the memory device. Thus, the memory device stores the binary output of the adder from an immediately previous FIFO clock period and outputs this stored binary output as one of the binary addend inputs to the adder during a current clock period. Whereby the look-ahead device by monitoring the WRITE control lines and the READ control lines of the FIFO looks ahead to a set of all possible changes in the FIFO data storage that could occur if any WRITE operation and any READ operation were completed in the FIFO clock period, the detecting device detects if any WRITE operation and any READ operation were completed during the FIFO clock period in order to control the selection of the change that corresponds to the operation completed state of the FIFO for the FIFO clock period from the set of all possible operation completed possibilities, and the adder adds the previous storage count to the change in the count to provide a count of bytes currently stored in the FIFO.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DETAILED DESCRIPTION OF A PREFERRED EMBODIMENT

Figure 1:
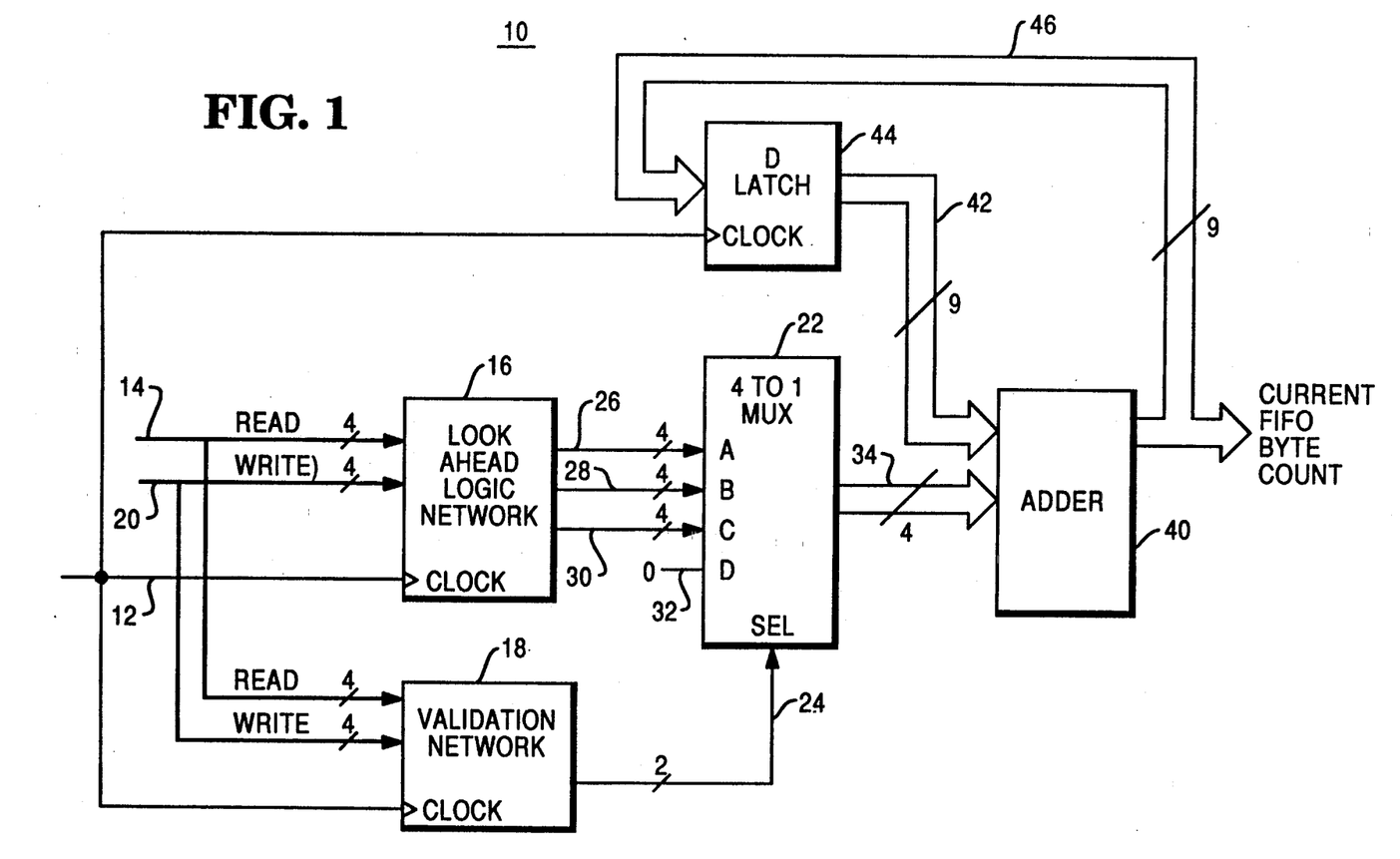
FIG. 1 is a block diagram of a look-ahead FIFO byte count circuit in accordance with the invention.

Referring now to FIG. 1, there is shown a block diagram illustrating the salient features of a look-ahead FIFO byte count apparatus 10 in accordance with the present invention. The look-ahead FIFO byte count apparatus 10 uses clock signals from a larger system or sub-system (not shown) which uses the look-ahead FIFO byte count apparatus 10 as a peripheral interface or a similar device. The clock signals are connected to the look-ahead FIFO byte count apparatus 10 via line 12.

The look-ahead FIFO byte count apparatus 10 also uses READ and WRITE control signals from a FIFO (not shown) which stores words consisting of one to four bytes. Each byte of a word is READ or WRITTEN individually, so each word in the FIFO may have up to four WRITE control signals controlling its input into the FIFO (not shown) and up to four READ control signals controlling its subsequent output from the FIFO. Management of the FIFO locations is performed in other circuitry (not shown) such that words of one to four bytes in length may be efficiently READ out of the FIFO and WRITTEN into the FIFO.

A four bit READ control bus 14 connects the FIFO READ control signals to the look-ahead FIFO byte count apparatus 10. This READ control bus 14 is connected to an input of a look-ahead network 16 and also to an input of validation network 18. Likewise, a four bit WRITE control bus 20 connects the FIFO WRITE control signals to the look-ahead FIFO byte count apparatus 10. This WRITE control bus 20 is connected to a second input of the look-ahead network 16 and also to a second input of the validation network 18.

Figure 2:
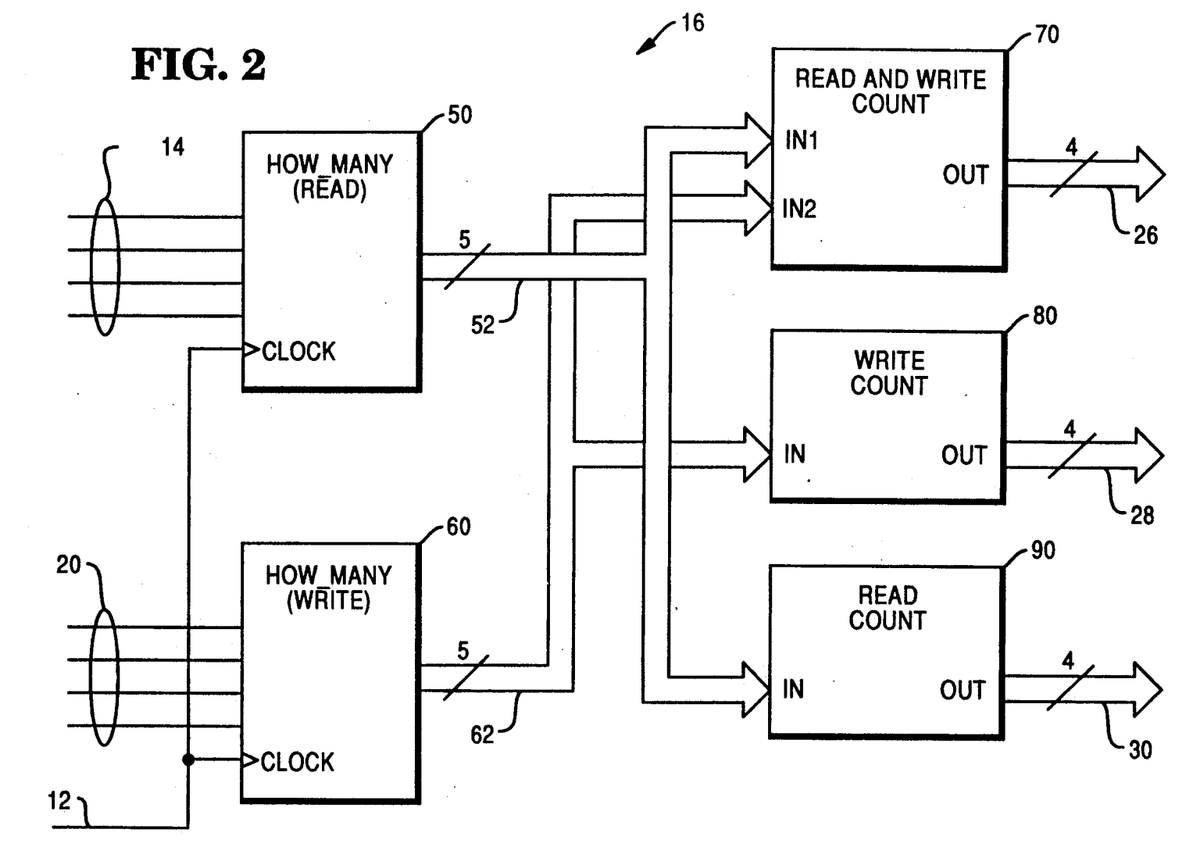
FIG. 2 is a detailed block diagram of the logic network shown in FIG. 1.

The look-ahead network 16, which is described in greater detail later in regard to FIG. 2, is connected to the clock line 12. Each clock cycle defines a FIFO memory period. The clock period is selected to provide a condition such that not more than one word may be READ into the FIFO and not more than one word may be WRITTEN from the FIFO during a single clock period. With this condition, one word of from one to four bytes may be READ into the FIFO and another word may be WRITTEN out of the FIFO during that time. For every byte that is READ from the FIFO, a count of the number of FIFO bytes stored is reduced by one byte. Similarly, for every byte that is WRITTEN from the FIFO, the count of the number of FIFO bytes stored is increased by one byte.

The look-ahead network 16 monitors the READ bus 14 to determine if a READ operation was in progress during each respective clock period. The READ bus 14 has four lines, each corresponding to one byte position of a word that might be READ from the FIFO. If a READ of a four byte word is in progress, all four READ lines will be active during the clock period. If a READ of a three byte word is in progress, three READ lines will be active during the clock period, and so forth for READs of two and one byte words.

Similarly, the look-ahead network 16 monitors the WRITE bus 20 to determine if a WRITE operation was in progress during each respective clock period. The WRITE bus 20 also has four lines, each corresponding to one byte position of a word that might be WRITTEN into the FIFO. If a WRITE of a four byte word is in progress, all four WRITE lines will be active during the clock period. If a WRITE of a three byte word is in progress, three WRITE lines will be active during the clock period, and so forth for WRITEs of two and one byte words.

The look-ahead network 16, as its name suggests, "looks ahead" to possible results to the number of bytes stored in the FIFO from the READ and WRITE activity in the current clock period. The possible results during any clock period are: one word was READ and one word was WRITTEN (READ and WRITE possibility), one word was READ (READ possibility), one word was WRITTEN (WRITE possibility), and no word was READ or WRITTEN (NULL possibility). For example, if a READ of a four byte word and a WRITE of a two byte word were both in progress during the current clock period, a net decrease of two bytes to the number of bytes stored in the FIFO would result (a WRITE of two bytes decreased by a READ of four bytes) as the READ and WRITE possibility.

The READ possibility presumes that any READ operation in progress will be completed in the current clock period and that any WRITE operation in progress will not be completed. For the above example, the net result is a reduction of the number of bytes stored in the FIFO by four bytes as the READ possibility.

The WRITE possibility presumes that that any WRITE operation in progress will be completed in the current clock period and that any READ operation in progress will not be completed. For the above example, the net result is a net increase of the number of bytes stored in the FIFO by two bytes as the WRITE possibility.

The NULL possibility presumes that neither operation in progress will be completed, and that there will be no change to the number of bytes stored in the FIFO during the current clock period.

The look-ahead network 16 thus, has three, four bit binary outputs which correspond to the bytes WRITTEN less the bytes READ (READ-and-WRITE), the bytes READ (READ), and the bytes WRITTEN (WRITE). The NULL output corresponding to no bytes READ or WRITTEN is omitted as an output since it always consists of binary zeroes, and there is an easier and faster way to provide such signals as will be explained below. If the net result for READ-and-WRITE output is negative, that is if the bytes READ exceed the bytes WRITTEN, the READ-and-WRITE possibility is a two's complement binary number. Additionally, the READ output is always in two's complement binary representation. Thus, the look-ahead network 16 generates all READ and/or WRITE possibilities, one of which will be used to update the count of the bytes stored in the FIFO.

The validation network 18 also monitors the lines of the READ bus 14 and the WRITE bus 20, but for a different reason. It monitors these lines to determine if a READ operation that was in progress has been completed, if a WRITE operation that was in progress has been completed, if both READ and WRITE operations that were in progress have been completed, or if neither a READ operation nor a WRITE operation has been completed during the clock period of interest. In a preferred embodiment of the invention, the READ and WRITE control signals are independent of each other, but they are not entirely asynchronous since READ and WRITE control signals when they go active and/or inactive always do so shortly after a rising or falling edge of the clock signal. Those skilled in the art will recognize that other embodiments of the invention could handle asynchronous READ and WRITE control signals. For the preferred embodiment, this determination is made as the READ and WRITE operations are completed. Since the lengths of the WRITE cycles and the READ cycles are not set with respect to each other, it is possible that a READ and/or WRITE operation that is in progress may not be completed in the clock period of interest, and therefore it will continue into the next clock period.

In the embodiment shown in FIG. 1, a 00 binary output indicates that both a READ operation and a WRITE operation were completed, a 01 binary output indicates that a WRITE operation was completed, a 10 binary output indicates that a READ operation was completed, and a binary 11 indicates that no operation was completed during the clock period. Those skilled in the art will recognize that other assignments of these four binary outputs are possible, and such modifications are deemed to be within the scope of the present invention.

A four bit wide, 4-to-1 multiplexer 22, sometimes referred to as a 16-to-4 multiplexer, has its two bit select input connected via bus 24 to the two bit output of the validation network 18. The multiplexer 22 has its first four bit input connected to the READ-and-WRITE output of the look-ahead logic network 16 via bus 26. A second four bit input of the multiplexer 22 is connected to the WRITE output of the look-ahead logic network 16 via bus 28, and a third four bit input of the multiplexer 22 is connected to the READ output via bus 30. The fourth four bit input of the multiplexer 22, since it is always all binary zeroes, has its lines hard-wired to logic LO via bus 32 in order to supply an input which corresponds to the NULL output of the look-ahead logic network 16. The select input binary numbers select which the four inputs will be multiplexed to a four bit output of the multiplexer 22 in a manner well known in the multiplexer art.

The four bit output of the multiplexer 22 is connected via bus 34 to a first four bit addend input of an ADDER 40. The four bits of this first input correspond to the four least significant digits of the ADDER 40. The ADDER 40 has a second addend input which is connected via bus 42 to an output of a multi-bit wide D-LATCH 44. Further, a multi-bit output of the ADDER 40 is connected via bus 46 to an input of the D-LATCH 44. The ADDER 40, the buses 42, 46 and the D-LATCH 44 have as many significant bits as it takes to express the maximum capacity in bytes of the FIFO. One embodiment of the FIFO byte count apparatus 10 has a 512 byte FIFO which requires at least nine significant bits to address. For such an embodiment, ADDER 40, buses 42, 44 and D-LATCH 44 would all be at least nine bits wide.

The ADDER 40 and the 4-to-1 multiplexer 22 are asynchronous devices, which means that their responses to their inputs do not wait for the next clock period, but appear after the passage of any internal propagation delays. The ADDER 40 asynchronously adds its addend inputs to provide its sum output. The ADDER 40 can also perform a subtraction operation by means of adding the input from bus 42 with the two's complement input from bus 34 whenever the net result in a clock period is negative. Even so, since the Select Outputs of the validation network 18 are synchronous, the count of the number of bytes stored in the FIFO is a substantially a synchronous output of the ADDER 40.

Referring now to FIG. 2, the look-ahead logic network 16 will be described. The look-ahead logic network 16 receives the READ control line signal, the WRITE control signals, and the clock signal. With these inputs, the look-ahead logic network 16 performs five separate internal logic functions to provide the three output possibilities, READ-and-WRITE, WRITE, and READ.

A HOW_MANY function 50 has combinational logic to output a total number of READ control lines which were active during the current clock period. The READ bus 14 and its four READ control lines are connected to the HOW_MANY function 50. The HOW_MANY function 50 in one embodiment of the invention is part of a PAL integrated circuit, the PAL equations for which are given in Appendix A. The output is of the HOW_MANY function 50 is an active signal on one of five lines of five bit bus 52 indicating that 0, 1, 2, 3, or 4 READ control lines were active during the current clock period.

A second HOW_MANY function 60 has its four bit input connected to the four WRITE control lines of the WRITE control bus 20 and its five bit output connected to another five line output bus 62. Other than its input and output connections, the HOW_MANY function 60 is identical to the HOW_MANY function 50 discussed above. The output of the HOW_MANY function 60 is a signal driven on one of five lines of five bit bus 62 indicating that 0, 1, 2, 3, or 4 WRITE control lines were active during the current clock period.

A READ-and-WRITE count function 70 has a five bit input IN1 connected to bus 52 and another five bit input IN2 connected to bus 62 to receive signals representing the number of READ control lines and WRITE control lines were active during the current clock period. The READ-and-WRITE count function 70 in one embodiment of the invention is part of a PAL integrated circuit, the PAL equations for which are given in Appendix A. The READ-and-WRITE count function 70 takes the number of bytes that might be WRITTEN into the FIFO (not shown) from the signal on bus 62 and using binary logic subtracts the number of bytes that might be READ from the FIFO. Since the data on buses 52 and 62 respectively are the READ and WRITE activity counts during the current clock period, the output of the asynchronous READ-and-WRITE count function 70 will be for that same period also. The output of the READ-and-WRITE count function 70 is a four bit binary number on four bit bus 26 which represents the net excess of the number of WRITE control signals active over the number of READ control signals active. Negative numbers are represented in two's complement binary representation.

A WRITE count function 80 has a five bit input connected to bus 62 to receive signals representing the number of WRITE control lines that were active during the current clock period. The WRITE count function 80 in one embodiment of the invention is part of a PAL integrated circuit, the PAL equations for which are given in Appendix A. The WRITE count function 80 using binary logic determines the number of bytes that might be WRITTEN into the FIFO (not shown) from the data on bus 62. Since the data on bus 62 is WRITE activity count during the current clock period, the output of the asynchronous WRITE count function 80 will be for that same period also. The output of the WRITE count function 80 is a four bit binary number on four bit bus 28 which represents the net number of WRITE control signals active.

A READ count function 90 has a five bit input connected to bus 52 to receive signals representing the number of READ control lines that were active during the current clock period. The READ count function 90 in one embodiment of the invention is part of the same PAL integrated circuit that the WRITE count function 80 is a part of. The PAL equations for the READ count function 90 are given in Appendix A. The READ count function 90 takes the number of bytes that might be READ from the FIFO according to the activity on bus 52. Since the data on bus 52 is the READ activity count during the current clock period, the output of the asynchronous READ count function 90 will be for that period also. The output of the READ count function 90 is a four bit binary number on four bit bus 30 which represents the number of READ control signals that were active during the current clock period. If the READ count output is selected by the validation network 18 (shown in FIG. 1), the output will represent a negative update to the number of bytes stored in the FIFO, and, as mentioned above with respect to the READ-and-WRITE count function 70, a negative result is represented as a two's complement binary number.

Figure 3:
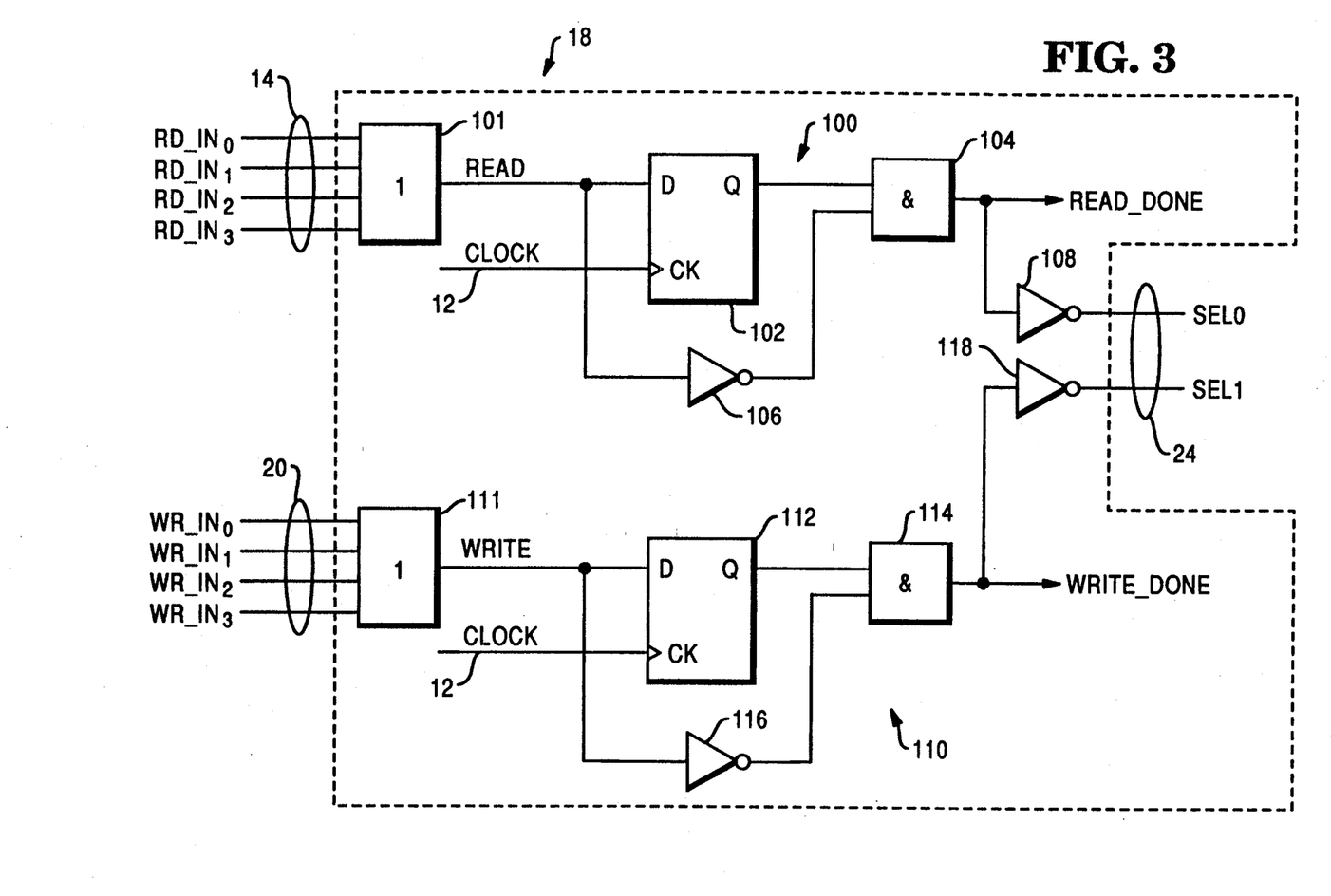
FIG. 3 is a detailed block diagram of the validation network shown in FIG. 1.

Referring now to FIG. 3, the validation network 18 will be described. The validation network 18 is made up of two identical logic functions: READ_DONE 100 and WRITE_DONE 110. The READ_DONE 100 has a four input OR gate 101 which has four inputs connected to the four READ control lines, $RD\_IN_0-RD\_IN_3$, of READ control bus 14. The output of the OR gate 101 is connected to a data input of a D-latch 102. The clock input of the D-LATCH 102 is connected to the clock line 12. The Q output of the D-LATCH 102 is connected to one input of an AND gate 104. Additionally, the output of the OR gate 101 is connected through an inverter 106 to a second input of AND gate 104. The output of the AND gate 104 is the READ_DONE signal. The output of the AND gate 104 is further connected to an inverter 108 to provide the Select_0 signal on one line of bus 24.

The WRITE_DONE 110 receives the four lines $WR\_IN_0-WR\_IN_3$ of the WRITE control bus 20 into its four input OR gate 111. The circuit connections downstream of the output of the OR gate 111 is connected to D-LATCH 112, AND gate 114, inverter 116 and inverter 118 in the same manner that the corresponding components are connected in the READ_DONE 100. In this manner, the WRITE_DONE signal and the Select_1 signal are provided.

Select_1 signal is outputted from inverter 118 on a second line of bus 24. Those skilled in the art will recognize that the validation network could be realized as part of a PAL integrated circuit. The PAL equations for such a realization are given in Appendix A.

Figure 4:
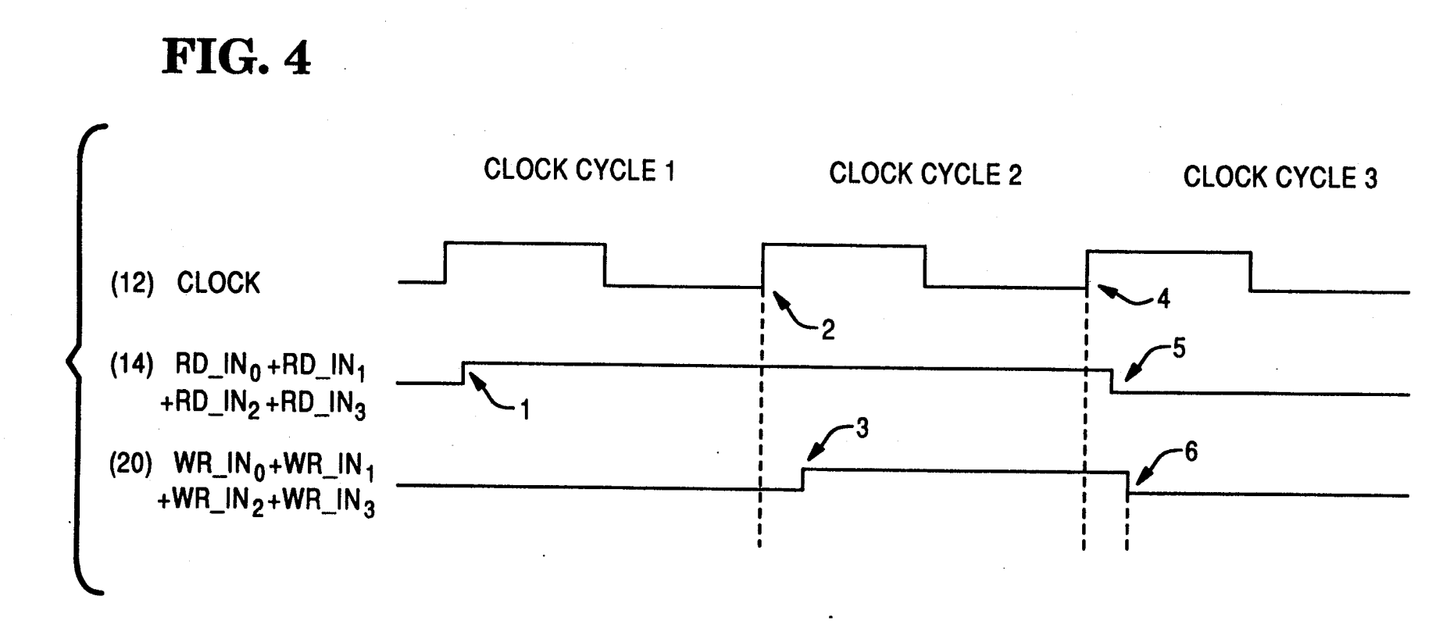
FIG. 4 is a plot of a combination of input signals useful for understanding the validation network that is shown in FIG. 3.

Referring now to FIGS. 3 and 4, operation of the validation network will be described. The initial condition of the clock signal on line 12, the Boolean sum of the READ control signals $RD\_IN_0-RD\_IN_3$, and the Boolean sum of the WRITE control signals $WR\_IN_0-WR\_IN_3$ are all logic LOs. After the clock signal goes to logic HI in clock cycle 1, the sum of the READ control signals also goes to logic HI at 1, thus the READ control lines are active. The WRITE control signals $WR\_IN_0-WR\_IN_3$ remain at logic LO and are thus inactive during clock cycle 1. In clock cycle 2, the sum of the READ control lines remains at logic HI and the sum of the WRITE control signals goes to logic HI at location 3 just after the positive going transition of the clock signal at location 2. Thus in clock cycle 2, there is both READ activity and WRITE activity, but neither is complete. In clock cycle 3 after the positive going transition of the clock signal at location 4, the sum of the READ control lines goes to logic LO at location 5 and the sum of the WRITE control lines goes to logic LO at location 6. Since logic LO of the READ and WRITE control lines indicates inactivity, both a READ and a WRITE operation from a FIFO (not shown) were completed during clock cycle 3. The validation network 18 would respond to clock cycles 1-3 with READ_DONE=WRITE_DONE=HI and SEL_0=SEL_1=LO. These select outputs would select the READ and WRITE output from look-ahead logic network 14 and multiplex them to ADDER 40 in order to update the current FIFO byte count before the completion of cycle 3. Near the end of each clock cycle there is a region where the READ lines and the WRITE lines of the preferred embodiment cannot change any further because they are synchronous signals, and in this time region the output of the ADDER 40 cannot change any further and represent the valid change to the FIFO byte count for the current period.

Thus, it will now be understood that there has been disclosed a LOOK-AHEAD FIFO BYTE COUNT APPARATUS which provides a rapid count of the number of bytes in a FIFO by providing a set of four possible look-ahead updates to a byte count register and then selecting and validating the proper update from the set of four at the end of each clock period. This validated update is then added or subtracted from the previous count in the byte count register to provide a current FIFO byte count.

As will be evident from the foregoing description, certain aspects of the invention are not limited to the particular details of the example illustrated, and it is therefore contemplated that other modifications or applications will occur to those skilled in the art, such as counting the unoccupied bytes remaining in the the FIFO instead of counting the bytes occupied FIFO. It is accordingly intended that the claims shall cover all such modifications and applications which do not depart from the true spirit and scope of the invention.

APPENDIX A

HOW_MANY

This determines how many bytes are active, READ or WRITE

INPUTS

IN_0, IN_1, IN_2, IN_3        (BYTE ACCESSES, READ or WRITE)

OUTPUTS

ZERO, ONE, TWO, THREE, FOUR

```
ZERO  = !IN_3 & !IN_2 & !IN_1 & !IN_0

ONE   =  IN_3 & !IN_2 & !IN_1 & !IN_0
      + !IN_3 &  IN_2 & !IN_1 & !IN_0
      + !IN_3 & !IN_2 &  IN_1 & !IN_0
      + !IN_3 & !IN_2 & !IN_1 &  IN_0

TWO   =  IN_3 &  IN_2 & !IN_1 & !IN_0
      + !IN_3 &  IN_2 &  IN_1 & !IN_0
      + !IN_3 & !IN_2 &  IN_1 &  IN_0
      +  IN_3 & !IN_2 & !IN_1 &  IN_0

THREE =  IN_3 &  IN_2 &  IN_1 & !IN_0
      + !IN_3 &  IN_2 &  IN_1 &  IN_0
      +  IN_3 & !IN_2 &  IN_1 &  IN_0
      +  IN_3 &  IN_2 & !IN_1 &  IN_0

FOUR  =  IN_3 &  IN_2 &  IN_1 &  IN_0
```

NOTE: "+", "&" and "!" are operators denoting Boolean OR, AND and NOT (i.e. complementing operation) respectively. The operation denoted by the operator pertains to the variable immediately following it.

READ & WRITE

This determines how much to add or subtract
if both read and write lines go inactive

INPUTS

R_0, R_1, R_2, R_3, R_4    (READ OUTPUTS FROM 'READ HOW_MANY')
   W_0, W_1, W_2, W_3, W_4    (WRITE OUTPUTS FROM 'WRITE HOW_MANY')

OUTPUTS

DATA_3, DATA_2, DATA_1, DATA0

```
D D D D
A A A A
T T T T
A A A A
3 2 1 0
-------
0 0 0 0  - add zero  (same number of reads and writes)
0 0 0 1  - add one   (one more write than read)
0 0 1 0  - add two   (two more writes than reads)
0 0 1 1  - add three (three more writes than reads)
0 1 0 0  - add four  (four more writes than reads)

1 1 1 1  - sub one   (one more read than write)
1 1 1 0  - sub two   (two more reads than writes)
1 1 0 1  - sub three (three more reads than writes)
1 1 0 0  - sub four  (four more reads than writes)

DATA_0 =   W_1 & R_0      #
         + W_2 & R_1      #   ADD ONE
         + W_3 & R_2      #
         + W_4 & R_3      #

+ W_3 & R_0      #   ADD THREE
         + W_4 & R_1      #

+ R_1 & W_0      #
         + R_2 & W_1      #   SUB ONE
         + R_3 & W_2      #
         + R_4 & W_3      #

+ R_3 & W_0      #   SUB THREE
         + R_4 & W_1      #

DATA_1 =   W_2 & R_0      #
         + W_3 & R_1      #   ADD TWO
         + W_4 & R_2      #

+ W_3 & R_0      #   ADD THREE
         + W_4 & R_1      #

+ R_1 & W_0      #
         + R_2 & W_1      #   SUB ONE
           R_3 & W_2      #
         + R_4 & W_3      #

+ R_2 & W_0      #   SUB TWO
         + R_3 & W_1      #
         + R_4 & W_2      #

DATA_2 =   W_4 & R_0      #   ADD FOUR

+ R_1 & W_0      #
         + R_2 & W_1      #   ANY READ GREATER THAN WRITE
         + R_2 & W_0      #
         + R_3 & W_2      #
         + R_3 & W_1      #
         + R_3 & W_0      #
         + R_4 & W_3      #
```

```
             + R¯4 & W¯2         #
             + R¯4 & W¯1         #
             + R¯4 & W¯0         #

DATA_3 =       R¯1 & W¯0         #
             + R¯2 & W¯1         #       ANY READ GREATER THAN WRITE
             + R¯2 & W¯0         #
             + R¯3 & W¯2         #
             + R¯3 & W¯1         #
             + R¯3 & W¯0         #
             + R¯4 & W¯3         #
             + R¯4 & W¯2         #
             + R¯4 & W¯1         #
             + R¯4 & W¯0         #
```

WRITE

This determines how much to add
if write lines go inactive

INPUTS

W_0, W_1, W_2, W_3, W_4    (WRITE OUTPUTS FROM 'WRITE HOW_MANY')

OUTPUTS

DATA_3, DATA_2, DATA_1, DATA_0

```
    D D D D
    A A A A
    T T T T
    A A A A
    3 2 1 0
    -------
    0 0 0 0  - add zero   (same number of reads and writes)
    0 0 0 1  - add one    (one more write than read)
    0 0 1 0  - add two    (two more writes than reads)
    0 0 1 1  - add three  (three more writes than reads)
    0 1 0 0  - add four   (four more writes than reads)

DATA_0 =   W_1
         + W_3

DATA_1 =   W_2
         + W_3

DATA_2 =   W_4

DATA_3 =   '0'
```

READ

This determines how much to subtract
if read lines go inactive

INPUTS

R_0, R_1, R_2, R_3, R_4    (READ OUTPUTS FROM 'READ HOW_MANY')

OUTPUTS

DATA_3, DATA_2, DATA_1, DATA_0

```
D D D D
A A A A
T T T T
A A A A
3 2 1 0
-------
1 1 1 1  - sub one    (one read)
1 1 1 0  - sub two    (two reads)
1 1 0 1  - sub three  (three reads)
1 1 0 0  - sub four   (four reads)
```

DATA_0 = R_1
       + R_3

DATA_1 = R_1
       + R_2

DATA_2 = R_1
       + R_2
       + R_3
       + R_4

DATA_3 = R_1
       + R_2
       + R_3
       + R_4

READ_DONE OR WRITE_DONE

This determines if any of the read lines or any of the write
lines go inactive

INPUTS

IN_0, IN_1, IN_2, IN_3    (BYTE ACCESSES READ or WRITE)

OUTPUTS

```
READ_DONE, SEL_0

READ_DONE=LATCH_READ & (!IN_0 + !IN_1 + !IN_2 + !IN_3)
SEL_0 = !READ_DONE

WRITE_DONE, SEL_1

WRITE_DONE=LATCH_WRITE & (!IN_0 + !IN_1 + !IN_2 + !IN_3)
SEL_1 = !WRITE_DONE
```

What is claimed as new and desired to be secured by Letters Patent of the United States is:

1. A FIFO control apparatus for use with a FIFO memory having a READ control line, a WRITE control line, and a clock line, comprising:
   a look-ahead digital circuit connected to the READ control line, the WRITE control line, and the clock line for determining a net change in a number of bytes stored in the FIFO memory during each period of a clock signal on the clock line;
   an adder; and
   a memory device connected to the output of the adder for storing the current number of bytes stored in the FIFO memory, an output of the memory device is connected back to an input of the adder for combining each net change in the number of bytes stored with a current number of bytes stored in the FIFO memory to update the current number of bytes stored with the net changes.

2. The FIFO control apparatus, according to claim 1, wherein the look-ahead digital circuit includes a look-ahead sub-circuit for generating all possible net changes to the number of bytes stored in the FIFO memory by determining if any READ operation was started and if any WRITE operation as started, and a validation sub-circuit for determining if any READ operation was completed and if any WRITE operation was completed and selecting the appropriate net change to the number of bytes stored in the FIFO memory from all of the possible net changes that were generated by the look-ahead sub-circuit.

3. A FIFO data storage monitor apparatus for use with a FIFO having a plurality of READ control lines and a plurality of WRITE control lines, comprising:
   clock pulse means for defining a FIFO clock period;
   look-ahead means connected to the plurality of READ control lines and the plurality of WRITE control lines for providing a number of WRITE control lines that were active during the FIFO clock cycle, a number of READ control lines that were active during the FIFO clock period, and a net number of bytes that is equal to the number of WRITE control lines that were active diminished by the number of READ control lines that were active during the FIFO clock period as three binary outputs thereof;
   means for detecting if one of four operation completed possibilities: a WRITE operation, a READ operation, both WRITE and a READ operations, or neither WRITE nor READ operation, was completed during the FIFO clock period, the detecting means having one input connected to the WRITE control lines, another input connected to the READ control lines, a timing input connected to the clock pulse means, and a two bit binary output, the two bit binary output providing four possible binary outputs, each corresponding to one of the four operation completed possibilities;
   selector means having three binary data inputs, each connected to a different one of the three binary outputs of the look-ahead means, a fourth binary input which is connected to logic LO, and a two-bit binary selection input connected to the output of the detecting means for selecting one of the three outputs from the look-ahead means or the logic LO input according to the output of the detecting means as an output thereof;
   an adder having one input connected to the output of the selector means, a second input, and a binary output; and
   memory means, having a data input connected to the binary output of the adder, a control input connected to the clock pulse means, and a memory output connected to the second input of the adder, for storing the binary output of the adder from a previous FIFO clock period and outputting this stored binary output as one of the binary inputs to the adder;
   whereby the look-ahead means by monitoring the WRITE control lines and the READ control lines of the FIFO looks ahead to a set of all possible changes in the FIFO storage capacity that could occur if any WRITE operation and any READ operation were completed in the current FIFO clock period, the detecting means detects if any WRITE operation and any READ operation were completed during the immediately previous FIFO clock period in order to control the selection of the change that corresponds to the operation completed state of the FIFO for the clock period from the set of all possible operation completed possibilities, and the adder adds the previous storage count to the change in the count to provide a current count of bytes stored in the FIFO.

4. The FIFO data storage monitor apparatus, according to claim 3, wherein said look-ahead means is a programmable array logic device.

5. The FIFO data storage monitor apparatus, according to claim 3, wherein said selector means is a sixteen-to-four multiplexer.

6. The FIFO data storage monitor apparatus, according to claim 3, wherein the memory means is a type D latch.

7. The FIFO data storage monitor apparatus, according to claim 3, wherein if the number of READ lines that showed an operation completed exceeds the number of WRITE control lines that showed an operation completed in a FIFO clock period, then the input to the selector means will be in two's complement representation.

8. The FIFO data storage monitor apparatus, according to claim 5, wherein if the number of READ lines that showed an operation completed exceeds the number of WRITE control lines that showed an operation completed in a FIFO clock period, then the input to the multiplexer will be in two's complement representation.

9. A FIFO data storage capacity monitor apparatus for use with a FIFO having a plurality of READ control lines and a plurality of WRITE control lines, comprising:

clock pulse means for defining a FIFO clock period;

look-ahead means connected to the plurality of READ control lines and the plurality of WRITE control lines for providing a number of WRITE control lines that were active during the FIFO clock period, a number of READ control lines that were active during the FIFO clock period, and a net number of bytes that is equal to the number of WRITE control lines that were active diminished by the number of READ control lines that were active during the FIFO clock period as three binary outputs thereof;

means for detecting if one of four operation completed possibilities: a WRITE operation, a READ operation, both WRITE operation and READ operation, or neither WRITE not READ operation, was completed during the FIFO clock period, said detecting means having one input connected to the WRITE control lines, another input connected to the READ control lines, a timing input connected to the clock pulse means, and a two bit binary output, the two bit binary output providing four possible binary outputs, each corresponding to one of the four operation completed possibilities;

selector means having three binary data inputs, each connected to a different one of the three binary outputs of the look-ahead means, a fourth binary input which is connected to logic LO, and a two-bit binary selection input connected to the output of the detecting means for selecting one of the three outputs from the look-ahead means or the logic LO input according to the output of the detecting means as an output of the selector means;

an adder having one binary input connected to the output of the selector means, a second binary input, and a binary output; and memory means, having a data input connected to the binary output of the adder, a control input connected to the clock pulse means, and a memory output connected to the second input of the adder, for storing the binary output of the adder from the previous FIFO clock period and outputting this stored binary output as one of the binary inputs to the adder;

whereby the look-ahead means by monitoring the WRITE control lines and the READ control lines of the FIFO looks ahead to a set of all possible changes in the FIFO storage capacity that could occur if any WRITE operation and any READ operation were completed in the current FIFO clock period, the detecting means detects if any WRITE operation and any READ operation completed during the current FIFO clock period in order to control the selection of the change that corresponds to the one of four operation completed possibilities of the FIFO for the clock period from the set of all possible changes, and the adder adds the previous storage capacity to the current change in capacity to provide the current storage capacity of the FIFO.

10. The FIFO data storage capacity monitor apparatus, according to claim 9, wherein said look-ahead means is a programmable array logic device.

11. The FIFO data storage capacity monitor apparatus, according to claim 9, wherein said selector means is a sixteen-to-four multiplexer.

12. The FIFO data storage capacity monitor apparatus, according to claim 9, wherein the memory means is a type D latch.

13. The FIFO data storage capacity monitor apparatus, according to claim 9, wherein if the number of WRITE control lines that showed an operation completed is less than the number of READ control lines that showed an operation completed in a FIFO clock period, then the input to the selector means will be in two's compliment representation.

14. A method for counting data stored in a FIFO having a plurality of READ control lines and a plurality of WRITE control lines, comprising the steps of:

defining a FIFO clock period;

providing a number of the plurality of WRITE control lines that were active during the FIFO clock period, a number of the plurality of READ control lines that were active during the FIFO clock period, and net number of bytes that is equal to a number of WRITE control lines that were active diminished by a number of READ control lines that were active during the FIFO clock period as three binary outputs of a look-ahead circuit;

detecting if one of four operation completed possibilities: a WRITE operation completed, a READ operation completed, both WRITE and READ operation completed, or neither WRITE nor READ operation completed, occurred during the FIFO clock period, and providing a two bit binary output with each possible combination of the two bits representing one of the four operation completed possibilities;

selecting one of the three outputs from the look-ahead device or a logic LO input, according to the output of the detecting means, as an output of a selector;

adding one input from the output of the selector to a second input from a memory output, for providing a binary sum output; and storing the binary sum output of the adder from a previous FIFO clock period in the memory, the memory having a data input connected to the binary output of the adder, and a memory output connected to the second input of the adder;

outputting this stored binary sum output as one of the binary inputs to the adder;

monitoring the WRITE control lines and the READ control lines of the FIFO to look ahead to generate a set of all possible changes to the byte count of the FIFO that could occur if any WRITE operation and any READ operation were completed in the current FIFO clock period;

controlling by a detecting means to select the change to the byte count that corresponds to the operation completed by the FIFO for the clock period from the set of all possible operation completed possibilities, and adding the previous byte count to the change in the byte count to provide a current byte count of the data stored in the FIFO.

* * * * *